(12) United States Patent
De Kock

(10) Patent No.: US 9,982,739 B2
(45) Date of Patent: *May 29, 2018

(54) SHOCK ABSORBER

(71) Applicant: Koni B.V., Oud-Beijerland (NL)

(72) Inventor: Paul De Kock, Numansdorp (NL)

(73) Assignee: KONI B.V., Oud-Beijerland (NL)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/472,347

(22) Filed: Mar. 29, 2017

(65) Prior Publication Data

US 2017/0198778 A1    Jul. 13, 2017

Related U.S. Application Data

(62) Division of application No. 14/652,555, filed as application No. PCT/NL2013/050476 on Jul. 1, 2013, now Pat. No. 9,631,695.

(30) Foreign Application Priority Data

Dec. 21, 2012    (NL) .................................... 2010038

(51) Int. Cl.
  *F16F 9/348*    (2006.01)
  *F16F 9/44*     (2006.01)
  *F16F 9/18*     (2006.01)

(52) U.S. Cl.
  CPC ............ *F16F 9/3482* (2013.01); *F16F 9/18* (2013.01); *F16F 9/3481* (2013.01); *F16F 9/44* (2013.01); *F16F 2230/32* (2013.01)

(58) Field of Classification Search
  CPC .... F16F 9/3482; F16F 9/44; F16F 9/18; F16F 9/3481; F16F 2230/32

(Continued)

(56) References Cited

U.S. PATENT DOCUMENTS

| 2,740,500 | A | 4/1956 | Brundrett et al. |
| 3,134,460 | A | 5/1964 | Bourcier de Carbon |

(Continued)

FOREIGN PATENT DOCUMENTS

| DE | 19750155 | 5/1998 |
| EP | 0905409  | 3/1999 |

(Continued)

OTHER PUBLICATIONS

International Search Report dated Oct. 11, 2013, corresponding to PCT/NL2013/050476.

*Primary Examiner* — Thomas J Williams
*Assistant Examiner* — Mariano Sy
(74) *Attorney, Agent, or Firm* — Young & Thompson

(57) ABSTRACT

A shock absorber includes a cylinder; a piston movable therein and dividing the cylinder in first and second cylinder chambers; a cylinder attachment for attachment to a first part of a vehicle and connected to the cylinder; and a piston attachment for attachment to a second part of a vehicle and connected to the piston. The piston attachment and cylinder attachment move towards one another on an inward movement and away from one another on an outward movement. The piston includes a first inward channel; a first inward valve to open the first inward channel on inward movement; a first outward channel; a first outward valve to open the first outward channel on outward movement; a second inward channel; a second inward valve to open the second inward channel on inward movement; a second outward channel; and a second outward valve to open the second outward channel on outward movement.

14 Claims, 7 Drawing Sheets

(58) Field of Classification Search
USPC .............. 188/313, 322.13, 322.15, 282.6
See application file for complete search history.

(56) References Cited

U.S. PATENT DOCUMENTS

| | | |
|---|---|---|
| 4,895,229 A | 1/1990 | Kato |
| 5,242,038 A | 9/1993 | Yamaoka |
| 5,316,113 A | 5/1994 | Yamaoka |
| 5,398,786 A | 3/1995 | Mintgen |
| 5,823,306 A | 10/1998 | De Molina |
| 5,975,258 A | 11/1999 | Nezu |
| 6,119,829 A | 9/2000 | Nakadate |
| 6,340,081 B1 | 1/2002 | Keil |
| 6,460,664 B1 | 10/2002 | Steed et al. |
| 7,322,449 B2 | 1/2008 | Yamaguchi |
| 7,458,448 B2 | 12/2008 | Katou et al. |
| 8,307,964 B2 | 11/2012 | De Kock |
| 8,651,252 B2 | 2/2014 | Katayama et al. |
| 9,631,695 B2 * | 4/2017 | De Kock .............. F16F 9/46 |
| 2008/0041682 A1 | 2/2008 | De Kock |
| 2009/0038897 A1 | 2/2009 | Murakami |
| 2009/0107782 A1 | 4/2009 | Ota et al. |
| 2010/0000832 A1 | 1/2010 | De Kock |
| 2011/0180361 A1 | 7/2011 | De Kock et al. |

FOREIGN PATENT DOCUMENTS

| | | |
|---|---|---|
| EP | 1860341 | 11/2007 |
| EP | 1947363 | 7/2008 |
| EP | 2009319 | 12/2008 |
| EP | 2141382 | 1/2010 |
| EP | 2348227 | 7/2011 |

* cited by examiner

SHOCK ABSORBER

FIELD OF THE INVENTION

The invention related to the field of shock absorbers (or dampers) comprising a cylinder; a piston movable within the cylinder along a cylinder wall, the piston sealing against the cylinder wall and dividing the cylinder in a first cylinder chamber at a first piston side of the piston and a second cylinder chamber at a second piston side of the piston, the second piston side opposing the first piston side, and the first and second cylinder chambers being filled with a fluid; a cylinder attachment constructed and arranged for attachment to a first part of a vehicle and connected to the cylinder; and a piston attachment constructed and arranged for attachment to a second part of a vehicle and connected to the piston, the piston attachment and cylinder attachment being arranged to move towards one another on an inward movement and away from one another on an outward movement

BACKGROUND OF THE INVENTION

Such dampers or shock absorbers find wide application in vehicles, like cars, motor cycles, trains, etcetera, but can also be applied in other areas as well. The shock absorber is mounted in between two parts of the vehicle, such as in between the wheel of a car and the car body to damp the relative motion between the two parts. The shock absorber is required to show a certain damping behavior that may, inter alia, be dependent on the relative velocity of the movement of both parts with respect to one another. One can distinguish low, intermediate and high frequency regimes in the relative velocities of both parts, each regime requiring a certain damping behavior to provide the car with optimum road performance while also providing comfort to the driver and passengers. The required damping behavior is generally also dependent on whether the wheel is a front wheel or a rear wheel, whether the wheel has an independent wheel suspension or not, whether it concerns a sports car or a truck, etcetera. The shock absorber should allow accurate tuning of the required damping behavior, most preferably in a manner that provides an independent setting of damping variables for both inward and outward movements.

On the other hand, the shock absorbers should be cost-effective. In this respect one would like to have one type of shock absorber that can be generally applied. However, such shock absorber will not be optimally suited for its specific applications.

SUMMARY OF THE INVENTION

It is an object of the invention to provide a shock absorber of which damping behavior can be optimally tuned for the required application.

It is another or alternative object of the invention to provide a shock absorber of which damping variables can be independently set.

It is yet another or alternative object of the invention to provide a shock absorber of which damping variables for inward and outward movements are independent and thus do not influence one another.

It is yet another or alternative object of the invention to provide a shock absorber having parts that can be added or deleted as required to provide a shock absorber suited for a specific application.

It is yet another or alternative object of the invention to provide a shock absorber that is cost-effective.

It is yet another or alternative object of the invention to provide a shock absorber that is modular.

At least one of the above objects is achieved by a shock absorber comprising
  a cylinder;
  a piston movable within the cylinder along a cylinder wall, the piston sealing against the cylinder wall and dividing the cylinder in a first cylinder chamber at a first piston side of the piston and a second cylinder chamber at a second piston side of the piston, the second piston side opposing the first piston side, and the first and second cylinder chambers being filled with a fluid;
  a cylinder attachment constructed and arranged for attachment to a first part of a vehicle and connected to the cylinder; and
  a piston attachment constructed and arranged for attachment to a second part of a vehicle and connected to the piston,
  the piston attachment and cylinder attachment being arranged to move towards one another on an inward movement and away from one another on an outward movement, wherein the piston comprises
    a first inward channel constructed and arranged for fluid connection between the first and second cylinder chambers;
    a first inward valve constructed and arranged to open the first inward channel for fluid flow on inward movement in dependence of a fluid pressure in the first inward channel, and to at least substantially close the first inward channel for fluid flow on outward movement;
    a first outward channel constructed and arranged for fluid connection between the first and second cylinder chambers;
    a first outward valve constructed and arranged to open the first outward channel for fluid flow on outward movement in dependence of a fluid pressure in the first outward channel, and to at least substantially close the first outward channel for fluid flow on inward movement;
    a second inward channel constructed and arranged for fluid connection between the first and second cylinder chambers;
    a second inward valve constructed and arranged to open the second inward channel for fluid flow on inward movement in dependence of a fluid pressure in the second inward channel, and to at least substantially close the second inward channel for fluid flow on outward movement;
    a second outward channel constructed and arranged for fluid connection between the first and second cylinder chambers; and
    a second outward valve constructed and arranged to open the second outward channel for fluid flow on outward movement in dependence of a fluid pressure in the second outward channel, and to at least substantially close the second outward channel for fluid flow on inward movement,
  the first and second inward channels in combination providing for fluid connection between the first and second cylinder chambers, and the first and second outward channels in combination providing for fluid connection between the first and second cylinder chambers.

In an advantageous embodiment the piston comprises first and second piston modules,
the first piston module comprising
the first inward channel;
the first inward valve;
the first outward channel; and
the first outward valve, and
the second piston module comprising
the second inward channel;
the second inward valve;
the second outward channel; and
the second outward valve.

The modules allow the piston to be efficiently assembled. They further provide flexibility to the piston since modules providing different damping behavior can be designed and made, and assembled as required.

In an embodiment the first and second piston modules are arranged in series such that the first piston module is arranged at an outward direction facing side of the second piston module, and the second piston module is arranged at an inward direction facing side of the first piston module.

In an aspect the invention relates to a modular shock absorber comprising the above shock absorber, wherein the modular shock absorber is constructed such that one of the first and second modules is an optional module that can be added or omitted as required.

In another aspect the invention relates to a shock absorber kit comprising
a shock absorber comprising
a cylinder;
a piston movable within the cylinder along a cylinder wall, the piston sealing against the cylinder wall and dividing the cylinder in a first cylinder chamber at a first piston side of the piston and a second cylinder chamber at a second piston side of the piston, the second piston side opposing the first piston side, and the first and second cylinder chambers being filled with a fluid;
a cylinder attachment constructed and arranged for attachment to a first part of a vehicle and connected to the cylinder; and
a piston attachment constructed and arranged for attachment to a second part of a vehicle and connected to the piston,
the piston attachment and cylinder attachment being arranged to move towards one another on an inward movement and away from one another on an outward movement;
a first piston module comprising
a first inward channel constructed and arranged for fluid connection between the first and second cylinder chambers;
a first inward valve constructed and arranged to open the first inward channel for fluid flow on inward movement in dependence of a fluid pressure in the first inward channel, and to at least substantially close the first inward channel for fluid flow on outward movement;
a first outward channel constructed and arranged for fluid connection between the first and second cylinder chambers;
a first outward valve constructed and arranged to open the first outward channel for fluid flow on outward movement in dependence of a fluid pressure in the first outward channel, and to at least substantially close the first outward channel for fluid flow on inward movement; and
a second piston module comprising
a second inward channel constructed and arranged for fluid connection between the first and second cylinder chambers;
a second inward valve constructed and arranged to open the second inward channel for fluid flow on inward movement in dependence of a fluid pressure in the second inward channel, and to at least substantially close the second inward channel for fluid flow on outward movement;
a second outward channel constructed and arranged for fluid connection between the first and second cylinder chambers; and
a second outward valve constructed and arranged to open the second outward channel for fluid flow on outward movement in dependence of a fluid pressure in the second outward channel, and to at least substantially close the second outward channel for fluid flow on inward movement,
the first and second inward channels in combination providing for fluid connection between the first and second cylinder chambers, and the first and second outward channels in combination providing for fluid connection between the first and second cylinder chambers.

In a preferred embodiment one or both of the first outward valve and second inward valve comprise(s) a plate pack, the plate pack closing against a first valve seat and comprising at least one plate, which allows the valves to be configured in multiple and flexible ways to provide a desired damping behavior.

In another preferred embodiment one or both of the first inward valve and second outward valve comprise(s) a plate-type valve provided at an outward direction facing side of the second inward valve and an inward direction facing side of the first outward valve, respectively, which allows to provide a one-way passage for fluid flow on inward and/or outward movements and/or to provide a silent damper.

Preferably, one or both of the first inward valve and second outward valve comprise(s) a plate-type valve provided at an outward direction facing side of the piston and an inward direction facing side of the piston, respectively.

In yet another aspect the invention relates to a shock absorber comprising
a cylinder;
a piston movable within the cylinder along a cylinder wall, the piston sealing against the cylinder wall and dividing the cylinder in a first cylinder chamber at a first piston side of the piston and a second cylinder chamber at a second piston side of the piston, the second piston side opposing the first piston side, and the first and second cylinder chambers being filled with a fluid;
a cylinder attachment constructed and arranged for attachment to a first part of a vehicle and connected to the cylinder; and
a piston attachment constructed and arranged for attachment to a second part of a vehicle and connected to the piston,
the piston attachment and cylinder attachment being arranged to move towards one another on an inward movement and away from one another on an outward movement, wherein the piston comprises
a channel constructed and arranged for fluid connection between the first and second cylinder chambers; and
a valve constructed and arranged to open the channel for fluid flow on one of inward movement and outward movement in dependence of a fluid pressure in the channel, and to at least substantially close the channel for fluid flow on the other one of inward movement and outward movement, the valve comprising a plate pack, the plate pack closing against a first valve seat and comprising at least one plate.

Preferable, the piston comprises an additional channel constructed and arranged for fluid connection between the first and second cylinder chambers, the additional channel being arranged downstream of the valve on the one of inward movement and outward movement; and an additional valve constructed and arranged to open the additional channel for fluid flow on the one of inward movement and outward movement in dependence of a fluid pressure in the additional channel, and to substantially close the additional channel on the other one of the inward movement and outward movement, the additional valve comprising a plate-type valve.

The plate-type valve allows to provide a one-way passage for fluid flow on inward and/or outward movements and/or to provide a silent damper.

In an embodiment the plate pack comprises more than one plate so as to provide a required stiffness, which allows to tune the damper to a pressure at which the plate pack valve opens from its seat to provide a desired damping behavior.

In a preferred embodiment the plate pack comprises an open plate that provides for an open flow connection across the plate pack.

In an embodiment the open plate is provided such in the plate pack that the open plate closes against the first valve seat and comprises at least one opening or perimeter cut-out at a position associated with the first valve seat, which opening provides for the open flow connection.

In yet another preferred embodiment the first valve seat comprises at least one opening or groove providing for the open flow connection across the plate pack. Having an open flow connection provides for a soft damping behavior at especially relatively low velocities in inward and/or outward movements. Damping is largely reduced until a certain car velocity. The open flow connection is efficiently provided in these embodiments and can be accurately tuned to the desired behavior.

In another preferred embodiment the plate pack comprises a recess plate that comprises at least one recess in fluid communication with a side of the plate pack from which fluid may pass the plate pack upon opening from the first valve seat; and a cover plate adjacent the recess plate so as to cover the recess, the cover plate and recess being configured and arranged such that a fluid connection is provided across the plate pack upon opening of the cover plate with respect to the recess plate.

Having the recess and cover plates allows to provide a linear damping behavior in a required damping range. The fluid flow determining the linear behavior is well defined by the number of slits, and their width and length. The opening pressure is determined by the stiffness of the cover plate and the surface area of the cover plate exposed to fluid pressure acting the cover plate to open it. Such surface area of the cover plate can be exposed by the recesses.

Advantageously, the recess is configured as a slit extending from one of an inside perimeter and an outside perimeter of the recess plate towards the other one of the inside and outside perimeters, respectively, a length of the slit being smaller than a distance between the inside and outside perimeters, which efficiently provides a well-working recess. The other one of the inside and outside perimeters corresponds with a valve pack perimeter associated with the first valve seat.

In an embodiment a fluid pressure at which the cover plate opens the recess in the recess plate is lower than a fluid pressure at which the plate pack opens from the first valve seat, which provides the most preferred damping behavior.

In another advantageous embodiment the plate pack comprises a filler plate in between the recess plate and the cover plate at one of the inside and outside perimeters of the recess plate and cover plate at which the at least one recess of the recess plate is in fluid communication with the side of the plate pack from which fluid may pass the plate pack upon opening from the first valve seat such that the cover plate rests on the recess plate at another one of the inside and outside perimeters of the recess plate and cover plate in absence of a fluid flow through the at least one recess of the recess plate.

The filler plate provides for a larger surface area of the cover plate being exposed to a fluid pressure acting to open the cover plate. An opening pressure of the cover plate is therefore reduced. By selecting appropriate filler, cover and recess plates both the linear behavior and opening pressure of the linear valve can be carefully tuned.

In another preferred embodiment the plate-type valve is configured and arranged to close against a second valve seat and a third valve seat, the plate-type valve closing against the second and third valve seats on fluid flow from a side of the plate-type valve opposite to a side associated with the second and third valve seats, closing against the second valve seat in a rest position without either inward or outward movement, while providing a clearance between the third valve seat and the plate-type valve in the rest position, and opening from the second valve seat on fluid flow from the side of the plate-type valve associated with the second and third valve seats.

Such plate-type valve may efficiently provide for both a non-return valve and a silent-type valve.

Advantageously, the plate-type valve comprises at least one opening associated with a position at a side of the third valve seat which faces away from the second valve seat, to provide an open connection to a fluid channel with which the plate-type valve is not associated and to allow fluid passing in between plate-type valve and third valve seat to pass the plate-type valve.

In a further advantageous embodiment the plate-type valve is configured and arranged such as to perform a rolling-like movement when opening or closing, which provides for a silent type valve.

Desired characteristics are efficiently achieved when the plate-type valve is fixed at an inside position of the plate-type valve, while providing a free outside perimeter of the plate-type valve.

BRIEF DESCRIPTION OF THE DRAWINGS

Embodiments of the invention will further be described with reference to the accompanying drawings, in which like or same reference symbols denote like, same or corresponding parts, and in which

FIGS. 4a, 4b, 4c, 4d and 4e show plan views of plates comprised in plate packs of valves in the piston according to FIGS. 2a, 2b, 2c, 3 and 3a;

DETAILED DESCRIPTION OF EMBODIMENTS

Figure 1:
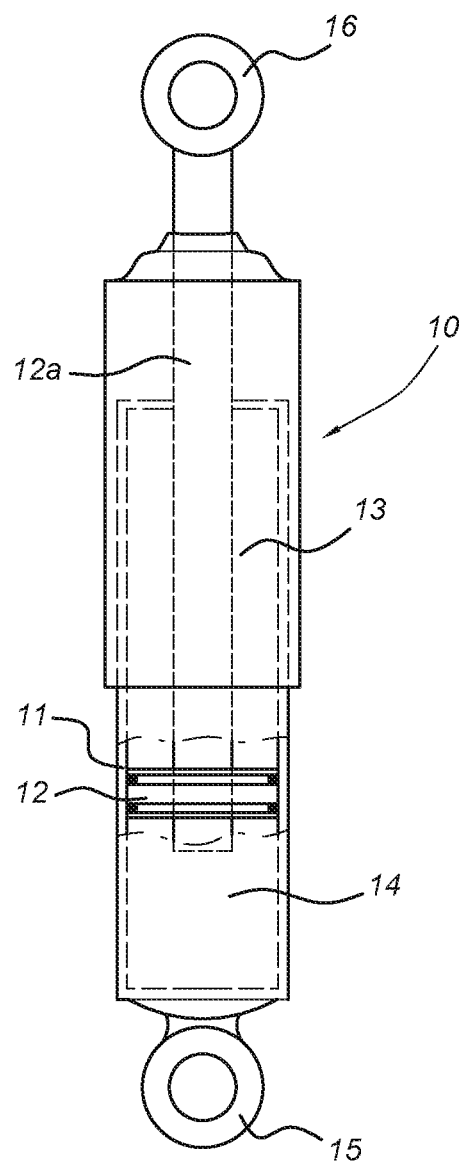
FIG. 1 shows a shock absorber according to the invention.

A shock absorber 10 is shown in FIG. 1 and comprises a cylinder 11 and a piston 12 displaceable in the cylinder along a cylinder wall. The piston seals against the cylinder wall and divides the cylinder in a first chamber 13 and a second chamber 14. A cylinder attachment 15 is connected to the cylinder and a piston attachment 16 is connected to the piston 12. A piston rod 12a extends as a part of the piston 12 to the piston attachment 16. The piston and cylinder attachments are arranged for attachment to parts of a vehicle, which can move with respect to one another in order to damp their relative movement. Both attachments move towards one another in an inward movement and away from one another in an outward movement. The vehicle may generally be a car, but can also be another vehicle like a train or a bus. Movements of the car body with respect to a wheel are damped by a damper as disclosed when the car is travelling over a surface like a road surface.

A fluid, not shown as such in the drawings, is contained in the cylinder chambers 13, 14 and can move in between cylinder chambers through flow and valve arrangements provided in and/or on the piston 12 according to the embodiments shown in the figures. The fluid can be a liquid, such as oil, or a gas, such as air.

Figure 2:
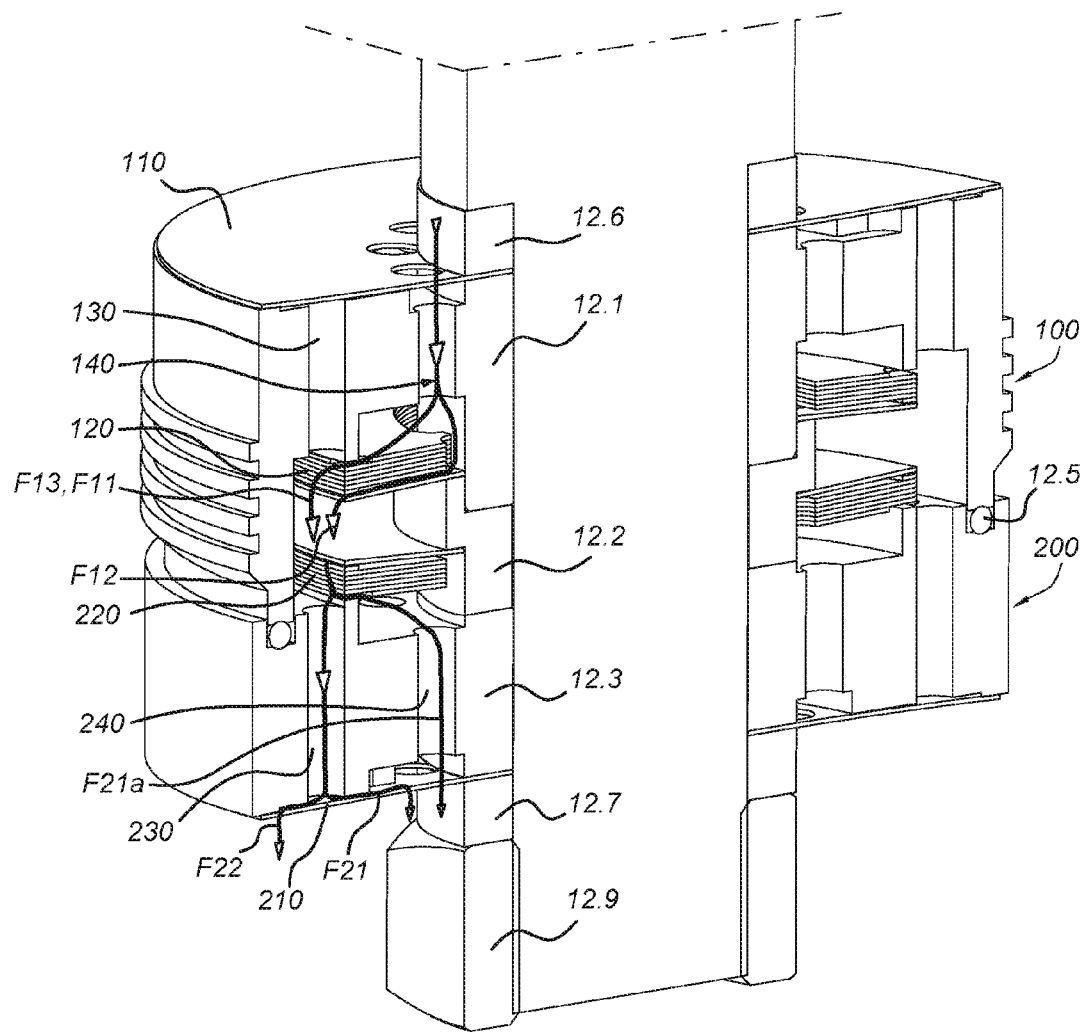
FIG. 2 shows the piston of the shock absorber of FIG. 1 in more detail, including fluid flows in three regimes on inward and outward movements of the shock absorber.
Figure 3:
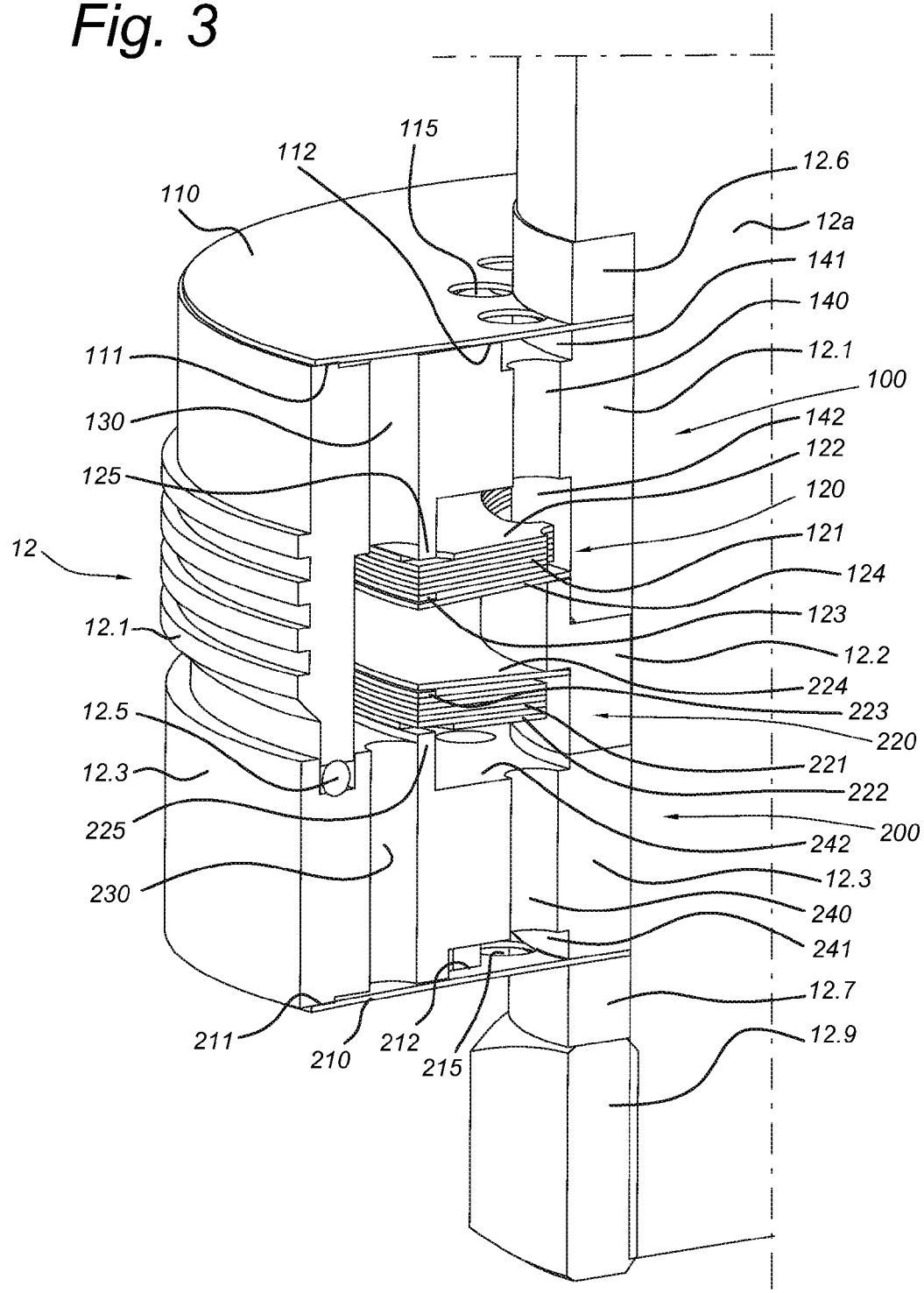
FIG. 3 shows part of the piston of FIGS. 1 and 2 in even more detail.

On outward movement the piston 12 moves in an upward direction in FIGS. 1 to 3, which causes an increase in fluid pressure in the first cylinder chamber 13. Fluid will enter into first outward channel 140 through openings 115 in plate valve 110. Chambers 141 and 142 are parts of the first outward flow channel 140. First outward valve 120 is a one-way valve closing off first outward channel 140 and may pass fluid in an outward flow direction from first cylinder chamber 13 to second cylinder chamber 14. Fluid can pass first outward valve 120 in different manners in three flow regimes. To achieve so the valve is embodied as a plate pack. The plate pack or valve 120 is held between intermediate piston part 12.2 and first valve seat 125 of top piston part 12.1, which are mounted on the piston rod 12a. The plate pack 120 comprises primary plates 121, open plate 122, recess plate 123 and closing plate 124, which are shown individually in FIGS. 4a to 4d.

Figure 4A:
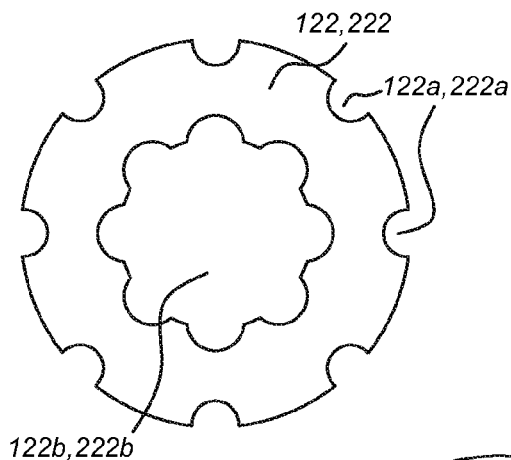
Figure 4B:
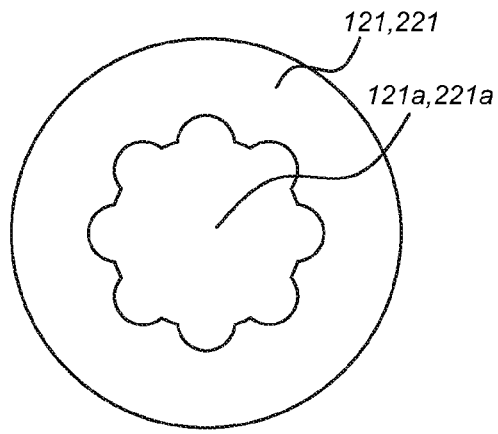

The plate pack closes on first valve seat 125 with open plate 122. Open plate 122 has openings 122a at its outer perimeter, as shown in FIG. 4a, at positions associated with first valve seat 125 such that fluid flow may occur through openings 122a across first valve seat 125, as indicated by flow path F11 in FIG. 2. FIG. 4a shows a plan view of open plate 122 with openings (outer perimeter cut-outs) 122a at a radius corresponding to the radius of the circular first valve seat 125. Open plate 122 has an inner opening 122b that allows mounting of the open plate on the upper piston part 12.1 around the piston rod 12a.

Primary plates 121 are mounted adjacent to the open plate 122 to provide a desired stiffness to the plate pack. Adding or deleting primary plates 121 would increase or reduce stiffness, respectively, of the plate pack and thus valve 120. A primary plate 121 is shown in plan view in FIG. 4b. Inner opening 121a allows mounting of the primary plate on the upper piston part 12.1 around the piston rod 12a. The outer radius of the primary plate 121 corresponds to the outer radius of the open plate 122. Fluid can pass in between piston rod 12a and primary and open plates 121, 122 through their respective inner openings 122b, 121a to arrive at recess plate 123 and cover plate 124.

Figure 4C:
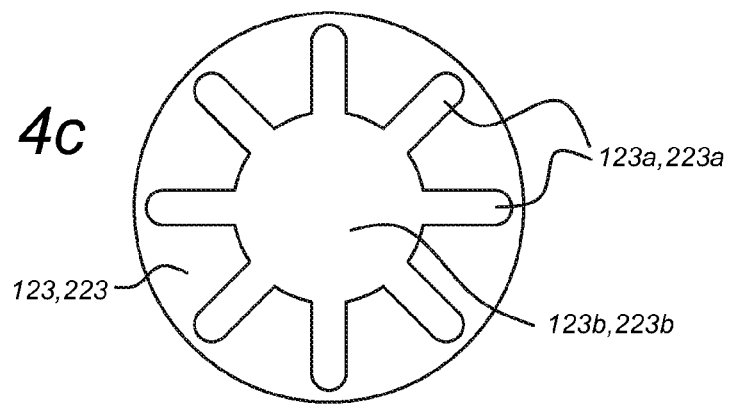
Figure 4D:
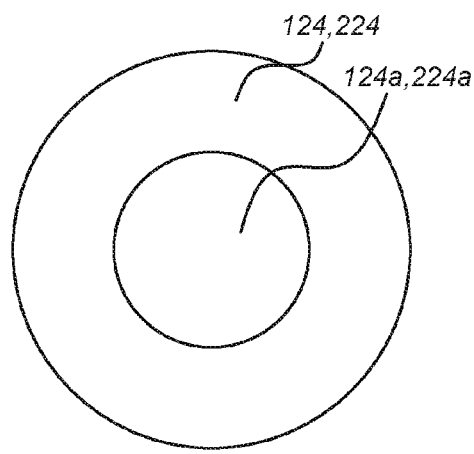

Recess plate 123 and cover plate 124 are shown in plan view in FIGS. 4c and 4d, respectively. The recess plate comprises recesses or slits 123a that extend from the inner perimeter towards the outer perimeter of the recess plate. The length of the slits is smaller than the distance between inner and outer perimeters such that there is no open connection between inner and outer perimeters as viewed long the plane of the drawing of FIG. 4c. Fluid can pass from first outward channel into the slit 123a of the recess plate 123. The cover plate 124 covers the recess plate to close off fluid flow through the slit 123a. The inner opening 123b of recess plate 123 allows passing of fluid and mounting of the recess plate on the upper piston part 12.1 around the piston rod 12a. The inner opening 124a of cover plate 124 allows mounting of the cover plate on the upper piston part 12.1 around the piston rod 12a.

Figure 3A:
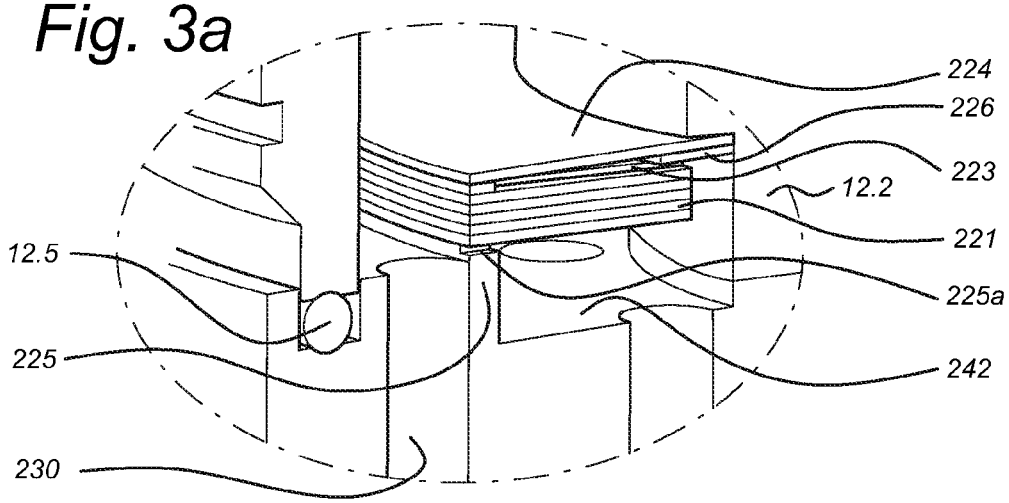
FIG. 3a shows a detail of FIG. 3 for another embodiment of the invention.

In an alternative embodiment of the plate pack 120 and associated first valve seat 125 the open plate 122 is dispensed with and small openings or grooves 125a are provided in the first valve seat to provide an open fluid connection F11 across valve 120, as is shown in FIG. 3a.

Figure 4E:
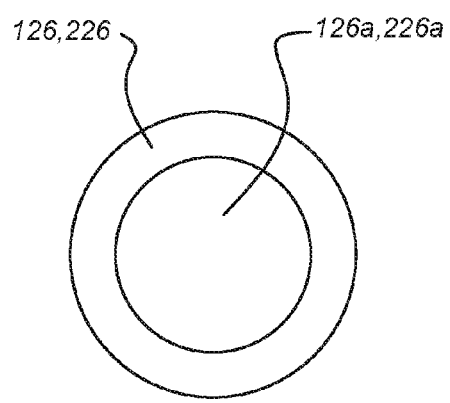

In another alternative embodiment, which is also shown in FIG. 3a, the plate pack comprises a filler plate 126, 226 in between recess plate 123, 223 and cover plate 124, 224 at the inside perimeter of the recess plate and cover plate. At this inside perimeter the recesses 123a, 223a of the recess plate are in fluid communication with the side of the plate pack from which fluid passes the plate pack upon opening from the first valve seat 125, 225. The cover plate 124,224 rests on the recess plate at the outside perimeter of the recess plate and cover plate in a state when there is no fluid flow through the recesses of the recess plate. The filler plate is shown individually in FIG. 4e and has an inside perimeter with a diameter equal to the diameter of the inside perimeter of the cover plate. The outside perimeter of the filler plate is such that the filler plate has a ring shape and covers part of the recesses of the recess plate at the inside perimeter of the recess plate. The remainder of the recess plate is left uncovered by the filler plate. This leaves part of the recesses 123a, 223a uncovered by the filler plate. The plate pack is under a bias pressure in between valve seat 125 and part 12.2 such that the inside perimeters of the plates in the plate pack 220 are pressed downwards in FIGS. 3 and 3a. This provides that an outside perimeter of the cover plate 124, 224 rests on the recess plate 123, 223, which closes off the recesses. This configuration provides that a larger surface area of the cover plate 124, 224 being exposed to fluid pressure of fluid passing through the recesses. As a result the cover plate opens at a lower fluid pressure since the opening force is dependent on both fluid pressure and the surface area the fluid pressure acts upon. The fluid pressure at which the cover plate opens can therefore be selected by providing a suitably dimensioned filler plate. The recesses still act as a flow resistance to fluid flow passing an opened cover plate in providing the linear damping behavior.

In a first flow regime at a relative low pressure difference across first outward valve 120 fluid passes the valve through the openings 122a in the open plate or the grooves 125a in the first valve seat, as shown by flow path or fluid connection F11 in FIG. 2. This will provide a soft damping behavior at relatively slow outward movements.

At faster outward movements a larger pressure difference across first outward valve 120 will build up and cover plate 124 will open from recess plate 123 to allow additional fluid flow through slits 123a of the recess plate, as indicated by flow path F12 in FIG. 2. The fluid flow F12 through the slits 123a as allowed by the cover plate 124 provides for a linear damping behavior. At this linear damping behavior flow resistance increases at increased pressure difference across the valve. The characteristic is largely given by the resistance provided by the recesses (slits) and the stiffness and a bias force of the cover plate.

At even faster outward movements the plate pack 120 will open from the first valve seat 125 to allow a large fluid flow F13 over first outward valve 120 through first outward channel 140, and substantially fully open first outward valve 120. Fluid connections F11 and F13 are indicated by the same fluid flow arrow in FIG. 2. However, fluid connection F11 only concerns fluid flow through openings 112a or grooves 125a, while fluid connection F13 concerns a fluid flow when plate pack 120 opens from first valve seat 125.

Figure 5A:
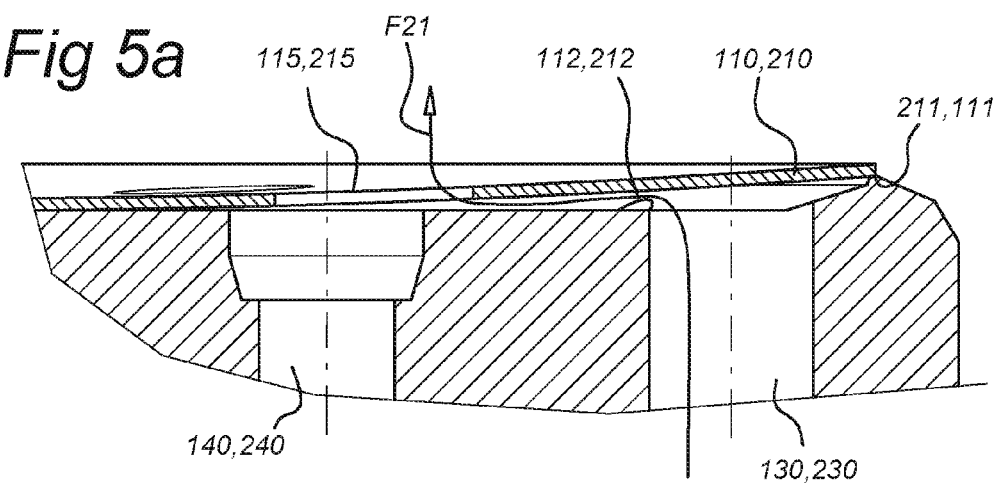
FIGS. 5a, 5b and 5c show details of a plate-type valve of the embodiments of the previous figures in three different flow regimes.

Fluid having passed first outward valve 120 on outward movements enters into second outward channel 230 to provide a fluid pressure increase in the second outward channel and a pressure difference across second outward valve 210. Second outward valve 210 is a plate-type valve that closes on second valve seat 211 in a rest position in which no pressure difference is present across the valve. The rest position is shown in more detail in FIG. 5a. Fluid may pass through the clearance in between plate-type valve 210 and third valve seat 212, and through openings 215 in the second outward valve 210. The clearance between valve 210 and third valve seat 212 provides for a constant open fluid connection across the second outward valve 210, as is shown by flow path F21 in FIGS. 2 and 5a. In combination with the open fluid connection F11 across first outward valve 120 it provides for a constant open fluid connection from first cylinder chamber 13 to second cylinder chamber 14 on outward movements.

It is noted that an additional constant fluid flow F21a will occur across second inward valve 220 that is configured alike but opposite to first outward valve 120. Second inward valve 220 also provides openings 222a in an open plate 222 across a first valve seat 225 (alike across first valve seat 125), or alternatively grooves 225a in first valve seat 225 (similar as described with respect to first valve seat 125 of first outward valve 120). The constant fluid connection or flow F21a across second outward valve 220 on outward movements is in parallel to the constant flow connection F21 on outward movements across second outward valve 210. The valves are configured such that constant open fluid connection F21 provides for a larger fluid flow than fluid connection F21a since flow connection F21 provides for a larger flow-through cross-sectional area. The constant open fluid connection between first cylinder chamber 13 and second cylinder chamber 14 on outward movements is a combination of flow connection F11 in series with the parallel connection of fluid flows F21 and F21a. Flow connection F11 provides a more restricted flow than flow connection F21 since flow connection F11 has a smaller flow-through cross-sectional area. The constant fluid flow between cylinder chambers 13 and 14 on outward movements is therefore determined by fluid flow connection F11, and therefore by the flow-through cross-sectional area provided by openings 122a or grooves 125a.

Figure 5B:
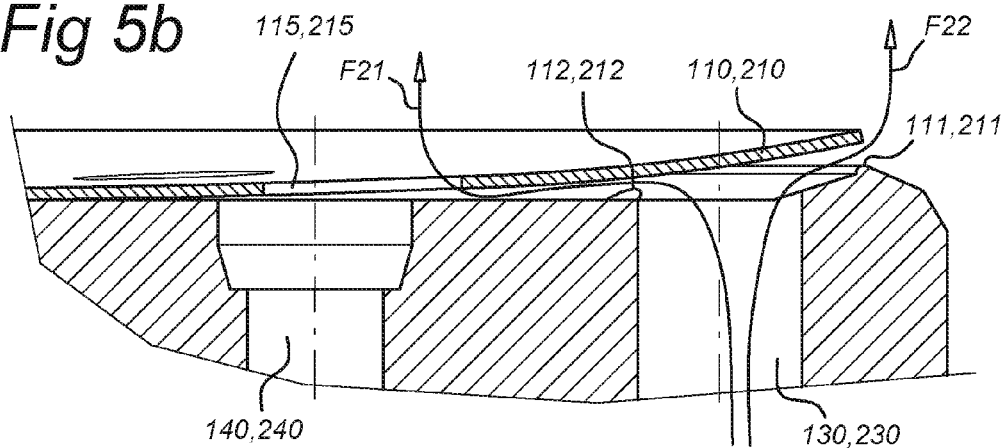

At faster outward movements a larger fluid pressure will build up in the second outward channel to result in a larger pressure difference across second outward valve 210, which will open second outward valve 210 from second valve seat 211. Opening of second outward valve 210 from second valve seat 211 provides for a larger fluid flow through second outward channel 230, which is shown as fluid flow F22 in FIG. 5b.

The second outward valve 210 is configured as a plate-type valve that is fixed at an inside position and has a free-moving outside perimeter. The plate-type valve is dimensioned and arranged such that it performs a rolling-like movement upon opening and closing. This provides for a silent valve that does not cause any noise at opening and closing movements. A cavitation that may occur for first outward valve 120 may cause a hiss-type noise. However, such noise will be largely reduced or even cancelled since such cavitation is enclosed within the space delimited by first and second piston parts 100 and 200. The configuration of first and second outward valves 120 and 210 as disclosed therefore provides for a silent damper.

Figure 5C:
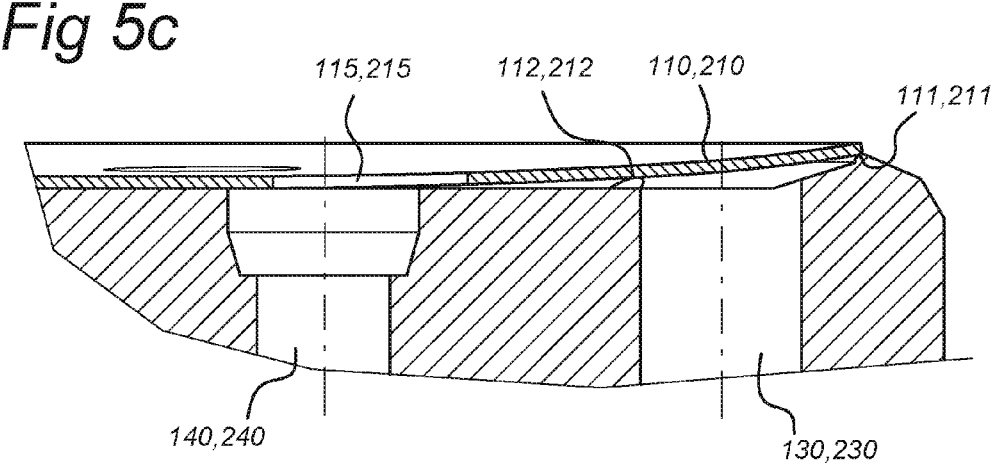

On inward movements an increased fluid pressure will build up in second cylinder chamber 14 to provide a pressure difference across second outward valve 210, which acts opposite to a pressure difference across the second outward valve 210 on outward movements. The pressure difference across second outward valve 210 at inward movements acts to close second outward valve 210 against both second valve seat 211 and third valve seat 212, which is shown in FIG. 5c. Second outward valve 210 therefore fully closes off fluid flow through second outward channel 230 at inward movements. Likewise, first inward valve 110 closes off first inward channel 130 on outward movements.

Therefore, on outward movements fluid only passes into first outward channel 140 from first cylinder chamber 13. The damping behavior on outward movements is therefore only determined by the configuration of the first and second outward channels 140 and 230 and the first and second outward valves 120 and 210. It allows accurate tuning of the desired damping behavior by separately selecting a constant flow, a linear damping behavior and range, and a blow off force.

On inward movements fluid will flow from the second cylinder chamber 14 to the first cylinder chamber 13. The fluid enters second inward channel 240, passes second inward valve 220, enters first inward channel 130 and passes first inward valve 110. The second and first inward valves 220 and 110 and the second and first inward channels 240 and 130 and are configured and arranged in a comparable way as first and second outward valves 120 and 210 and first and second outward channels 140 and 230, respectively. Second inward valve similarly comprises open plate 222 with openings 222a and 222b, primary plates 221, recess plate 223 with slits 223a and opening 223b, and cover plate 224. Second inward valve similarly closes on first valve seat 225 (that in an alternative embodiment may have openings or grooves similarly to grooves 125a of first valve seat 125). Second outward valve 210 comprises plate-type valve 210 with openings 215. Second outward valve similarly closes on second valve seat 211 and third valve seat 212. All variables of the damping behavior of the damper for both inward and outward movements can be set independent from one another. First inward valve 110 and second outward valve 210 also act as one-way valves for the outward and inward flow paths between first and second cylinder chambers 13, 14, respectively, so as to make both flow paths fully independent from one another.

Figure 6A:
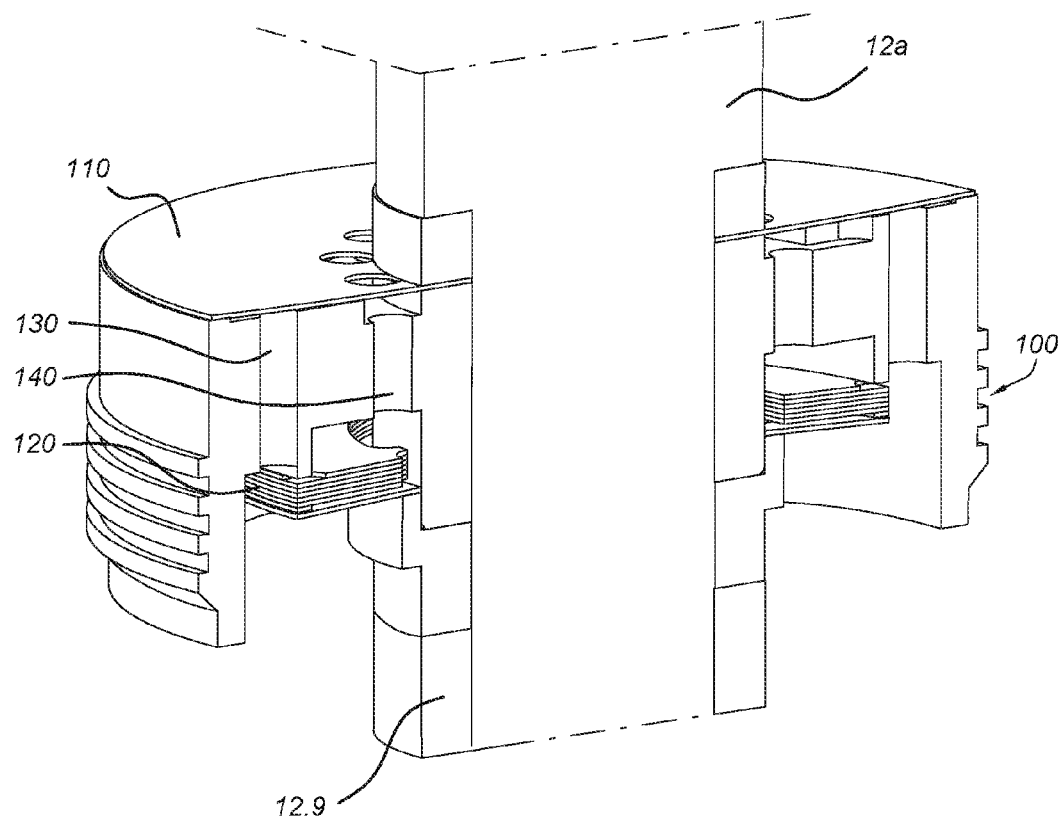
FIGS. 6a and 6b show embodiments of a shock absorber according to the invention with only one piston module fitted.
Figure 6B:
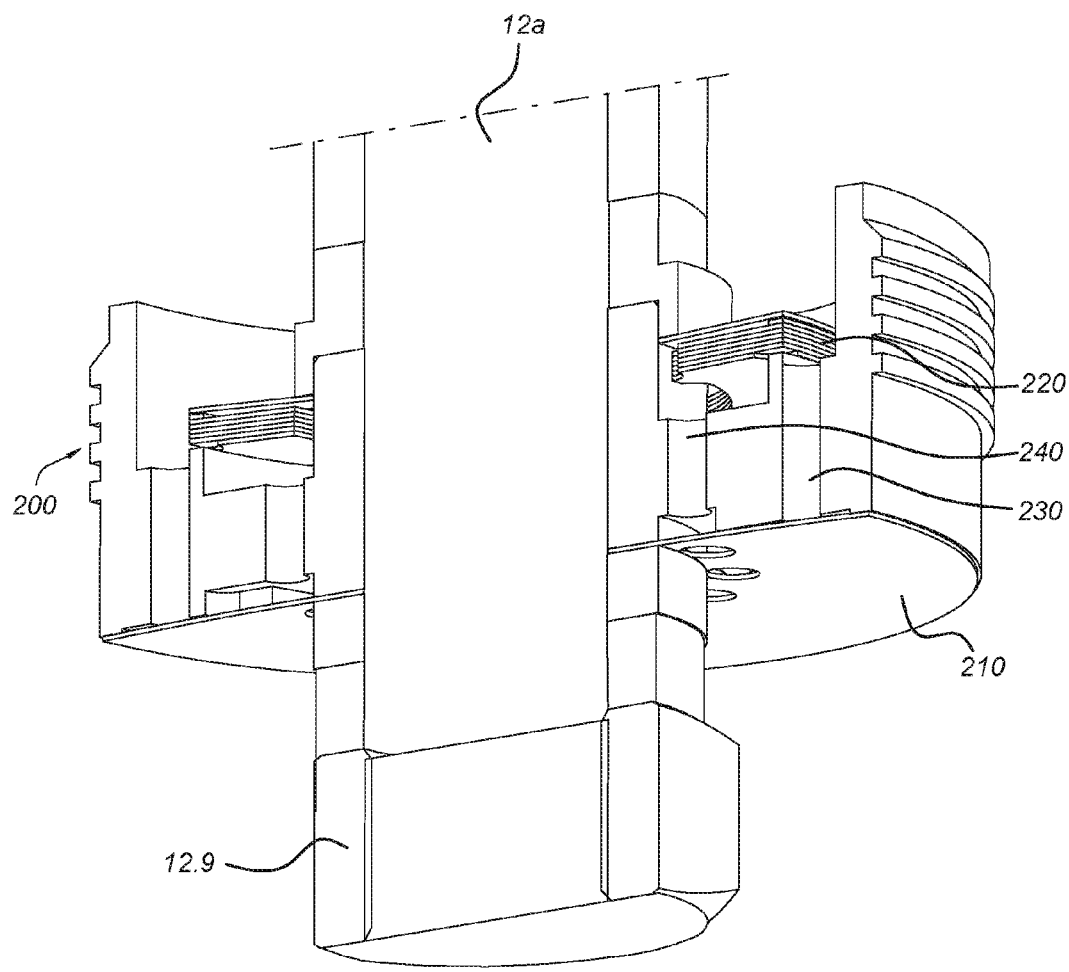

The piston comprises a first piston part 12.1 on which the first inward valve 110 and first outward valve 120 are mounted with the aid of intermediate piston part 12.2. Together they constitute a first piston module 100. Second piston part 12.3 together with second inward valve 220 and second outward valve 210 constitute a second piston module 200. Either one or both of the first and second modules may be mounted on the piston rod to form a piston since each module has flow channels and valves for inward and a valve for outward movements. The modules are mounted with the aid of spacer parts 12.6, 12.7 and a nut part 12.9 that screws onto the piston rod 12a. An O-ring 12.5 acts as a seal in between the first and second modules 100, 200. FIG. 6a shows a piston only having module 100 mounted. FIG. 6b shows also only module 100 mounted, but upside down with respect to the configuration of FIG. 6b. Such module 100 upside down is basically a module 200 of FIGS. 2 and 3, but with an additional sealing arrangement for sealing against the cylinder wall of cylinder 11. The embodiments shown in FIGS. 6a and 6b could comprise another plate pack or plate-type valve as disclosed, if desired.

The damper can be provided as a kit with the two separate first and second modules 100, 200. At use one or both modules may then be mounted as required. In some applications one of both modules may be sufficient, whereas other applications may require both modules. Application of only the first module as shown in FIG. 6a would provide a damper that is generally less stiff on inward movements than a damper having both modules. Such a damper could be applied at wheels having a fixed wheel suspension, which are generally the rear wheels of a car. Application of both modules as shown in FIGS. 2 and 3 would provide a damper that is generally stiffer than a damper having only one module. Such damper can be applied at wheels having an independent wheel suspension, which are generally the front wheels of a car. The kit may further comprise additional components to add an additional plate pack or plate-type valve, if desired, as disclosed in the previous paragraph.

Generally, multiple inward and outward channels are preferably present, as disclosed. Each set of similar associated channels has only one associated valve in the embodiments as disclosed. One could also envisage multiple valves per set of similar associated channels. One could also envisage one channels instead of a set similar associated channels. The disclosed embodiments with multiple associated similar channels and one associated valve seems preferred for reasons of efficiency, costs reliability and manufacturability. Various other embodiments of the invention will be apparent to the skilled person when having read the above disclosure in connection with the drawing, all of which are within the scope of the invention and accompanying claims.

The invention claimed is:
1. A shock absorber comprising:
a cylinder;
a piston movable within the cylinder along a cylinder wall, the piston sealing against the cylinder wall and dividing the cylinder in a first cylinder chamber at a first piston side of the piston and a second cylinder chamber at a second piston side of the piston, the second piston side opposing the first piston side, and the first and second cylinder chambers being filled with a fluid;
a cylinder attachment constructed and arranged for attachment to a first part of a vehicle and connected to the cylinder; and
a piston attachment constructed and arranged for attachment to a second part of a vehicle and connected to the piston,
the piston attachment and cylinder attachment being arranged to move towards one another on an inward movement and away from one another on an outward movement,
wherein the piston comprises
a first channel constructed and arranged for fluid connection between the first and second cylinder chambers;
a first valve constructed and arranged to open the channel for fluid flow on one of inward movement and outward movement in dependence of a fluid pressure in the channel, and to at least substantially close the channel for fluid flow on the other one of inward movement and outward movement, the valve comprising a plate pack, the plate pack closing against a first valve seat and comprising at least one plate;
a second channel constructed and arranged for fluid connection between the first and second cylinder chambers, the additional channel being arranged downstream of the valve on the one of inward movement and outward movement; and
a second valve constructed and arranged to open the additional channel for fluid flow on the one of inward movement and outward movement in dependence of a fluid pressure in the additional channel, and to substantially close the additional channel on the other one of the inward movement and outward movement, the second valve comprising a plate valve.

2. The shock absorber according to claim 1, wherein the plate pack comprises more than one plate so as to provide a required stiffness.

3. The shock absorber according to claim 1, wherein the plate pack comprises an open plate that provides for an open flow connection across the plate pack.

4. The shock absorber according to claim 3, wherein the open plate is provided such in the plate pack that the open plate closes against the first valve seat and comprises at least one opening or perimeter cut-out at a position associated with the first valve seat, which opening provides for the open flow connection.

5. The shock absorber according to claim 1, wherein the first valve seat comprises at least one opening or groove providing for the open flow connection across the plate pack.

6. The shock absorber according to claim 1, wherein the plate pack comprises
a recess plate that comprises at least one recess in fluid communication with a side of the plate pack from which fluid may pass the plate pack upon opening from the first valve seat; and
a cover plate adjacent the recess plate so as to cover the recess, the cover plate and recess being configured and arranged such that a fluid connection is provided across the plate pack upon opening of the cover plate with respect to the recess plate.

7. The shock absorber according to claim 6, wherein the recess is configured as a slit extending from one of an inside perimeter and an outside perimeter of the recess plate towards the other one of the inside and outside perimeters, respectively, a length of the slit being smaller than a distance between the inside and outside perimeters.

8. The shock absorber according to claim 7, wherein the other one of the inside and outside perimeters corresponds with a valve pack perimeter associated with the first valve seat.

9. The shock absorber according to claim 6, wherein a fluid pressure at which the cover plate opens the recess in the recess plate is lower than a fluid pressure at which the plate pack opens from the first valve seat.

10. The shock absorber according to claim 6, wherein the plate pack comprises:
 a filler plate in between the recess plate and the cover plate at one of the inside and outside perimeters of the recess plate and cover plate at which the at least one recess of the recess plate is in fluid communication with the side of the plate pack from which fluid may pass the plate pack upon opening from the first valve seat such that the cover plate rests on the recess plate at another one of the inside and outside perimeters of the recess plate and cover plate in absence of a fluid flow through the at least one recess of the recess plate.

11. The shock absorber according to claim 1, wherein the plate valve is configured and arranged to close against a second valve seat and a third valve seat the plate valve closing against the second and third valve seats on fluid flow from a side of the plate valve opposite to a side associated with the second and third valve seats,
 closing against the second valve seat in a rest position without either inward or outward movement, while providing a clearance between the third valve seat and the plate valve in the rest position, and
 opening from the second valve seat on fluid flow from the side of the plate valve associated with the second and third valve seats.

12. The shock absorber according to claim 11, wherein the plate valve comprises at least one opening associated with a position at a side of the third valve seat which faces away from the second valve seat.

13. The shock absorber according to claim 1, wherein the plate valve is configured and arranged such as to perform a rolling-like movement when opening or closing.

14. The shock absorber according to claim 1, wherein the plate valve is fixed at an inside position of the plate valve, while providing a free outside perimeter of the plate valve.

* * * * *